United States Patent [19]

Keithley

[11] Patent Number: 4,769,406

[45] Date of Patent: Sep. 6, 1988

[54] HOT MELT ADHESIVE

[75] Inventor: Robert J. Keithley, Hazlet, N.J.

[73] Assignee: Essex Specialty Products, Inc., Clifton, N.J.

[21] Appl. No.: 20,517

[22] Filed: Mar. 2, 1987

[51] Int. Cl.⁴ .......................... C08K 5/34; C08F 8/00; C08L 33/02

[52] U.S. Cl. .................................. 524/100; 524/101; 524/166; 524/270; 524/271; 524/272; 525/193; 525/221

[58] Field of Search ................ 525/193, 221; 524/270, 524/272, 271, 100, 101, 166

[56] References Cited

U.S. PATENT DOCUMENTS

| | | |
|---|---|---|
| 3,342,902 | 9/1967 | Peterkin . |
| 3,367,998 | 2/1968 | Osterrieth et al. . |
| 3,410,928 | 11/1968 | Baum . |
| 3,468,978 | 9/1969 | Battersby . |
| 3,600,347 | 8/1971 | Godar . |
| 3,615,106 | 10/1971 | Flanagan et al. . |
| 4,283,317 | 8/1981 | Murphy et al. ..................... 524/272 |
| 4,338,227 | 7/1982 | Ballard ................................ 524/271 |
| 4,338,415 | 7/1982 | Acharva et al. . |
| 4,358,557 | 11/1982 | Boggs . |
| 4,367,113 | 1/1983 | Karim et al. ....................... 524/271 |
| 4,535,013 | 8/1985 | Kuhn ................................... 524/272 |
| 4,550,141 | 10/1985 | Hoh .................................... 525/221 |
| 4,567,223 | 1/1986 | Ames .................................. 525/193 |
| 4,571,410 | 2/1986 | Nevins et al. ...................... 524/100 |
| 4,572,874 | 2/1986 | Chang et al. . |
| 4,581,266 | 4/1986 | Magnotta ........................... 525/277 |
| 4,602,056 | 7/1986 | Waniczek et al. ................. 524/272 |
| 4,613,632 | 9/1986 | Aliani et al. ....................... 524/272 |
| 4,631,308 | 12/1986 | Graham et al. .................... 524/272 |
| 4,654,389 | 3/1987 | Graham et al. .................... 525/221 |

Primary Examiner—Herbert J. Lilling
Attorney, Agent, or Firm—Curtis, Morris & Safford

[57] ABSTRACT

A hot melt adhesive suitable for bonding plastic, metal, and glass together has been developed by blending together into a homogenous mixture 10 to 20 weight percent of ethylene/vinyl acetate/acid functional terpolymer resin of low acid number, 15 to 50 weight percent of ethylene/vinyl acetate/acrylic acid terpolymer resin of high acid number and 30 to 60 weight percent of tackifying resins based on alpha-methylstyrene, rosin, or a terpene resin. Additionally, suitable antioxidants and surfactants are added to control the aging and application of the composition.

40 Claims, No Drawings

HOT MELT ADHESIVE

FIELD OF THE INVENTION

The present invention relates to a hot melt adhesive composition.

More specifically, this invention relates to a hot melt adhesive composition suitable for bonding a variety of materials, particularly for bonding plastic, metal and glass.

BACKGROUND OF THE INVENTION

Hot melt adhesives produce a bond by cooling of the adhesive, which is applied in a melted state. Hot melt adhesives are distinguishable from those products which require crosslinking or other chemical reactions to achieve ultimate bond strength or from those materials that require loss of solvent or water to achieve bond strength. Prior to heating, the hot melt adhesives are solids that can be provided in bulk or in pelletized or rod form for ease of handling. Upon heating, the hot melt adhesive composition melts rather sharply and flows readily for application to a substrate. Since the hot melt adhesives are thermoplastic rather than thermosetting, and are thus remeltable, they can be applied to a first substrate and later remelted to form a hot melt bond with a second substrate.

While many satisfactory hot melt adhesives are available to the art, the art is constantly seeking new compositions having superior performance or lower cost or both.

There are a variety of uses for hot melt adhesives. However, it has been found that while one hot melt adhesive may be used for bonding in a particular use or application, the adhesive may be completely unsuitable for other uses or applications.

OBJECTS OF THE INVENTION

It is therefore an object of this invention to provide a hot melt adhesive useful for bonding metals, glass and plastic materials having a softening point higher than that of the hot melt adhesive composition itself.

It is a second object of this invention to provide a hot melt adhesive for use in automotive applications.

It is an additional object of this invention to provide a hot melt adhesive exhibiting high bond strength under conditions of shock stress, high humidity, and extremes of temperature as normally encountered in the operation and storage of an automotive vehicle.

It is also an object of this invention to provide a hot melt adhesive having a melting point, wetting time, initial tack, setting time and pot life suitable for use in the automotive industry when applied either by hand or automatically.

It is a further object of this invention to provide a hot melt adhesive that is compatible with and can be used in conjunction with other types of adhesives normally used in the automotive industry.

These and other objects and advantages of the present invention will become more readily apparent after consideration of the following.

STATEMENT OF THE INVENTION

In one aspect of the present invention is directed to a high performance hot melt adhesive formed of a mixture including an ethylene/vinyl acetate/acid functional terpolymer resin of low acid number, an ethylene/vinyl acetate/acrylic acid terpolymer resin of high acid number and a tackifying resin. The tackifying resin is advantageously an alpha-methylstyrene, a rosin, or a terpene resin of the alpha-pinene, beta-pinene and d-limonene types.

In another of its aspects, the present invention relates to a hot melt composition having excellent properties for use in bonding many of the materials used in the automotive industry and other assembly operations. For example, the hot melt composition according to the present invention may be used to bond stainless steel or plastic to glass during installation of windows in the automotive industry, for bonding polycarbonate brackets to polycarbonate bumpers in automobiles and for bonding steel to metal, such as steel signs to metal doors.

DESCRIPTION OF PREFERRED EMBODIMENTS

The present invention, as well as other objects and features thereof, will be understood more clearly and fully from the following description of certain preferred embodiments.

The preparation of ethylene/vinyl acetate/acid functional terpolymer resins is known in the art. Generally, the preparation involves copolymerizing a mixture of ethylene, vinyl acetate and an acidic material such as acrylic or methacrylic acid by means of a free radical producing catalyst such as an organic peroxide at a pressure of 100 to 200 atmospheres and a temperature in the range of 150° to 250° C. and recovering the product.

The hot melt adhesive according to the present invention contains at least two terpolymer resins. Preferably, the hot melt adhesive contains two terpolymer resins. The terpolymer resins advantageously adhere to and bond the substrates, particularly plastic, metal and glass. Preferably, the terpolymer resins for use in the present hot melt adhesive composition have an elongation at break (ASTM D 1708) of 400 to 1000%, a ring and ball softening point (ASTM E 28) of 80° to 165° C., a density at 23° C. (ASTM D 1505) of 925 to 960 kg/m$^3$ and a tensile strength (ASTM D 1708) of 200 to 4000 psi.

The hot melt adhesive composition in accordance with the present invention contains at least one terpolymer resin having an acid number of 2 to 10 (milligrams potassium hydroxide per gram terpolymer) and at least one terpolymer resin having an acid number of 50 to 95.

The high acid functionality terpolymer resin in accordance with the present invention with an acid number of 50 to 95 imparts advantageous substrate wetting, adhesion to substrates such as plastic, metal and glass, and crosslinking sites along the polymer chain in the hot melt composition. Such resins have advantageous thermal stability required for automotive applications wherein temperatures are reached that are up to 100° C. higher than the point of thermal degradation of conventional ethylene/acrylic resins.

Preferably, the high acid functionality terpolymer resin contains 25 to 28% by weight of vinyl acetate and has an acid number of 50 to 70, a melt index of 450 to 550 dg/min (ASTM D 1238), a ring and ball softening point of 102° to 108° C. A preferred high acid functonality terpolymer resin of the present invention is an ethylene/vinyl acetate/acrylic acid terpolymer with an acid number of 60, a melt index of 500 dg/min, and a ring and ball softening point of 160° C. This product is commercially available under the trademark "Elvax 5610".

The melt index defines the amount of material that passes through an orifice as a function of time. Accordingly, the lower the melt index, the higher the viscosity and molecular weight of the composition and, conversely, the higher the melt index, the lower the viscosity and molecular weight of the composition.

The low acid functionality terpolymer resin in accordance with the present invention with an acid number of 2 to 10 imparts advantageous substrate wetting, adhesion to substrates such as plastic, metal and glass, flexibility, seal strength and, due to its elastomeric nature, increased resistance to vibrational and impact stress. The low acid functionality terpolymer resin also provides increased compatability of the hot melt adhesive composition with further additives which may be included in the composition to impart additional properties to the composition.

The proportion of vinyl acetate in the low acid functionality resin is important to the extent that it determines the resin's compatibility with other additives such as atactic polypropylene, an additive advantageously used in selected applications. Resins containing 20 to 40 weight percent of vinyl acetate are compatible with atactic polypropylene in amounts up to 25 weight percent at 250° to 400° F. The low acid functionality terpolymer resin contains advantageously 20 to 40 weight percent, preferably 23 to 35 weight percent, still more preferably 24 to 29 weight percent of vinyl acetate.

The acid moiety of the terpolymer resin of low acid number is preferably acrylic or methacrylic acid.

A preferred ethylene/vinyl acetate/acid functional terpolymer resin of low acid number contains 27 to 29% by weight vinyl acetate and has an acid number of 4 to 8, a melt index of 5 to 7, and a ring and ball softening point of 155° to 162° C., specifically 158° C. This product is commercially available under the trademark "Elvax 4260". An alternate terpolymer resin of the present invention contains 24 to 26% by weight vinyl acetate and has an acid number of 4 to 8, a melt index of 5 to 7, and a ring and ball softening point of 151° C. This product is commercially available under the trademark "Elvax 4355". Another terpolymer resin of the present invention contains 24 to 26% by weight vinyl acetate and has an acid number of 4 to 8, a melt index of 125 to 175, and a ring and ball softening point of 91° C. This product is commercially available under the trademark "Elvax 4320".

The hot melt composition further contains a tackifying resin. The tackifying resin according to the present invention advantageously imparts hot tack, substrate wetting and bond strength to the substrate while the hot melt composition is being applied to the substrate.

The tackifying resin is advantageously an alpha-methylstyrene, a rosin, or a terpene resin of the alpha-pinene, beta-pinene and d-limonene types. Preferably, the tackifying resin has a ring and ball softening point of 110° to 150° C., more preferably 110° to 135° C., a Gardner color of 2 to 10 and a flashpoint greater than 230° C.

A preferred alpha-methylstyrene tackifying resin of the present invention is commercially available under the trademark "Kristalex 1120". "Kristalex 1120" is a water white, color stable, nonpolar, thermoplastic hydrocarbon resin that is a copolymer of styrene and alpha-methylstyrene, and has a ring and ball softening point of 120° C., a specific gravity of 1.07 and a flashpoint of 232° C.

A preferred rosin type tackifying resin, commercially available under the trademark "Sylvatac 140", is a polymerized rosin with a ring and ball softening point of 140° C., a Gardner color of 10, an acid number of 135, a saponification number of 140 and a specific gravity of 1.08.

Preferred terpene tackifying resins according to the present invention are currently available under the trademark "Piccolyte". For example, "Piccolyte A115" is a polymerized alpha-pinene resin with a ring and ball softening point of 115° C., an acid number less than 1, and a specific gravity of 0.97. "Piccolyte C115" is a polymerized d-limonene resin with a ring and ball softening point of 115° C., an acid number less than 1, a specific gravity of 0.99 and a flashpoint of 235° C. "Piccolyte S115" is a polymerized beta-pinene resin with a ring and ball softening point of 115° C., an acid number less than 1, a specific gravity of 0.99 and a flashpoint of 234° C.

Other ingredients may be included in the hot melt composition according to the present invention.

For example, a silane adhesion promoter can be advantageously included. A polyunsaturated polyalkoxysilane 50% in siloxane commercially available under the trademark "CPS078.6S" is preferred. Other silanes may also be used as adhesion promoters.

Anionic and nonionic wetting agents that are stable at normal hot melt application temperatures may also be used. An example of a suitable wetting agent is sodium dioctyl sulfosuccinate.

An antioxidant is also advantageously included to control the aging of the composition. A preferred antioxidant is the 3,5-di-tert-butyl-4-hydroxyhydrocinnamic acid triester of 1,3,5-tris-(2-hydroxyethyl)-s-triazine-2,4,6-(1H,3H,5H)trione with a molecular weight of 1042 commercially available under the trademark "Vanox SKT". An alternate antioxidant is tetrakis[methylene(3,5-di-tert-butyl-4-hydroxyhydrocinnamate)]methane commercially available under the trademark "Irganox 1010".

An effective amount of atactic polypropylene, for example in an amount of from 5 to 20 weight percent of the formulation, may be included in the hot melt composition to improve the cohesive properties of the hot melt. A solid atactic polypropylene suitable for this invention has a molecular weight of 15,000 to 60,000 preferably 16,000 to 20,000, a ring and ball softening point of 144° to 150° C., a specific gravity of 0.83 to 0.87, and a flashpoint greater than 260° C.

The hot melt composition according to the present invention contains, by weight, 15 to 50 percent of ethylene/vinyl acetate/acrylic acid terpolymer resin of high acid number; 10 to 20 percent of ethylene/vinyl acetate/acid functional terpolymer resin of low acid number; 30 to 60 percent of tackifying resin; up to 1.5 percent, preferably 0.5 to 1.5 percent, of antioxidant; up to 25 percent, preferably 5 to 20 percent, of polypropylene; up to 1.0 percent, preferably 0.5 to 1.0 percent, of silane adhesion promoter; and up to 1.0 percent, preferably 0.5 to 1.0 percent, of a wetting agent.

Advantageously, the hot melt composition comprises 39 to 42 weight percent of ethylene/vinyl acetate/acrylic acid terpolymer resin of high acid number, 12.5 to 14.5 weight percent of ethylene/vinyl acetate/acid functional terpolymer resin of low acid number, 44 to 46 weight percent of tackifying resin, and 0.5 to 1.5 weight percent of an antioxidant.

The hot melt composition still more advantageously comprises 10 to 13 weight percent of ethylene/vinyl acetate/acid functional terpolymer resin of low acid number, 33 to 36 weight percent of ethylene/vinyl acetate/acrylic acid terpolymer resin of high acid number, 38 to 40 weight percent of tackifying resin, 10 to 16 weight percent of atactic polypropylene, and 0.5 to 1.5 weight percent of an antioxidant.

Most preferably, the hot melt composition comprises 17 to 18 weight percent of an alpha-methylstyrene resin, 34 to 36 weight percent of a d-limonene based terpene resin, 10 to 11 weight percent of atactic polypropylene, 0.5 to 1.0 weight percent of an antioxidant, 17 to 18 weight percent of ethylene/vinyl acetate/acid functional terpolymer resin of low acid number, 17 to 18 weight percent of ethylene/vinyl acetate/acrylic acid terpolymer resin of high acid number, 0.5 to 1.0 weight percent of a silane, and 0.5 to 1.0 weight percent of a wetting agent.

Further objects of this invention, together with additional features contributing thereto and advantages accruing therefrom, will be apparent from the following examples of the invention.

EXAMPLE 1

A hot melt adhesive was prepared having the following composition by weight:

| | |
|---|---|
| High acid number terpolymer resin ("Elvax 5610") | 40.5% |
| Low acid number terpolymer resin ("Elvax 4355") | 13.5% |
| Tackifying resin ("Piccolyte C115") | 45.0% |
| Antioxidant ("Vanox SKT") | 1.0% |
| | 100.0% |

The hot melt adhesive composition was prepared by first melting the terpolymer resins by heating to 400° F. Advantageously, the resins can be heated in a can with a heating mantle with agitation provided by an air motor driven propeller. After the resins were melted and uniformly mixed, the tackifying resin was added to the batch. When the tackifying resin was melted and uniformly mixed with the terpolymer resins, the antioxidant was added. After the antioxidant was melted and uniformly mixed, the hot melt had a viscosity at 400° F. of 6760 cps.

The hot melt adhesive had an advantageous melting point, wetting time, initial tack, setting time and pot life for use in the automotive industry.

The hot melt was applied to a steel plate using a 5 mil applicator blade. Refrigerator tubing cut in 1 inch lengths was immediately pressed into the hot melt. After cooling to room temperature, a pull of 215 lbs. using an "Instron" tester was required to delaminate the test pieces.

The hot melt was also used to bond a ½ square inch stainless steel clip and a ½ square inch plastic clip made of polybutyl terphthalate (PBT) to glass. The pull required to delaminate the stainless steel clip and the plastic clip using a shear test was 186 lbs. and 311 lbs., respectively.

EXAMPLE 2

Test samples were prepared in which stainless steel and PBT plastic clips were bonded to glass using the adhesive of Example 1.

The test samples were prepared by heating the hot melt to 400° F. in a hot melt gun. The glass plates were pre-heated to 80° C. in a circulating hot air oven. Sufficient hot melt was pumped into the respective clips to fill the clips to about two-thirds full. The glass was then pressed into the hot melt until the glass reached the bottom of the clip. At this point, the hot melt filled the clip and any excess was removed mechanically.

The following bond strength tests were run on the test samples after they had been conditioned at room temperature overnight. The tests were run on an "Instron" tester using a head speed of 50 mm/min.

| | |
|---|---|
| Original samples, unaged: | |
| S/S clips(steel/glass) | 286 lbs. |
| Failure | glass broke |
| PBT clips(PBT/glass) | 289 lbs. |
| Failure | glass broke |
| 1 week at 100% relative humidity at 100° F.: | |
| S/S clips | 485 lbs. |
| Failure | glass broke |
| PBT clips | 488 lbs. |
| Failure | glass broke |
| 10 days at ambient room temperature (66-74° F.): | |
| S/S clips | 667 lbs. |
| Failure | glass broke |
| PBT clips | 652 lbs. |
| Failure | glass broke |
| 4 hours at −40° F.: | |
| S/S clips | 476 lbs. |
| Failure | cohesive failure |
| PBT clips | 476 lbs. |
| Failure | cohesive failure |
| 500 hours in UV environment ["Weather-O-Meter"]: | |
| S/S clips | 513 lbs. |
| Failure | cohesive failure |
| PBT clips | 533 lbs. |
| Failure | glass broke |

The hot melt adhesive exhibited advantageous bond strength under conditions of high humidity and extremes of temperature as normally encountered in the operation and storage of an automotive vehicle.

EXAMPLE 3

Two hot melt adhesives were prepared having the following compositions by weight:

| | Ex. 3A | Ex. 3B |
|---|---|---|
| Low acid number terpolymer resin ("Elvax 4320") | 11.45% | 13.51% |
| High acid number terpolymer resin ("Elvax 5610") | 34.73% | 40.54% |
| Tackifying resin ("Piccolyte C115") | 38.17% | 45.05% |
| Polypropylene | 14.89% | — |
| Antioxidant ("Vanox SKT") | 0.76% | 0.90% |
| | 100.00% | 100.00% |
| Viscosity at 400° F. | 8300 cps. | 13,700 cps. |
| Density at 22° C. | 0.972 | 0.995 |
| Hardness Shore A | 85 | 90 |
| Bond Strength tests: | | |
| S/S clips | 572 lbs. | 286 lbs. |
| Failure | glass broke | glass broke |
| PBT clips | 792 lbs. | 289 lbs. |
| Failure | glass broke | glass broke |

Examples 3A and 3B show the benefit of adding polypropylene to the hot melt. The polypropylene serves to reduce the cost of the hot melt, and provides better adhesion to the glass.

EXAMPLE 4

Two hot melt adhesives were prepared having the following compositions by weight to compare the 3,5-di-tert-butyl-4-hydroxy-hydrocinnamic acid triester of 1,3,5-tris-(2-hydroxyethyl)-s-triazine-2,4,6-(1H,3H,5H)trione and tetrakis[methylene(3,5-di-tert-butyl-4-hydroxyhydrocinnamate)]methane antioxidants:

|  | Ex. 4A | Ex. 4B |
|---|---|---|
| Tackifying resin ("Piccolyte C115") | 45.05% | 45.05% |
| Antioxidant ("Vanox SKT") | 0.90% | — |
| Antioxidant ("Irganox 1010") | — | 0.90% |
| Low acid number terpolymer resin ("Elvax 4320") | 13.51% | 13.51% |
| High acid number terpolymer resin ("Elvax 5610") | 40.54% | 40.54% |
|  | 100.00% | 100.00% |
| Viscosity at 400° F. | 9600 | 11,000 |
| Density at 22° C. | 0.995 | 0.998 |
| Hardness Shore A | 85–90 | 85–90 |
| Ring & Ball mp °F. | 180 | 180 |
| *Samples tested at room temperature:* | | |
| S/S clips | 286 lbs. | 467 lbs. |
| Failure | glass broke | glass broke |
| PBT clips | 289 lbs. | 487 lbs. |
| Failure | glass broke | glass broke |
| *Samples tested at 80° C.:* | | |
| S/S clips | 48 lbs. | 20 lbs. |
| Failure | cohesive failure | cohesive failure |
| PBT clips | 89 lbs. | 69 lbs. |
| Failure | cohesive failure | cohesive failure |

EXAMPLE 5

Three hot melt adhesives were prepared having the following compositions by weight to demonstrate the effectiveness of adding silanes to the hot melt. The silanes evaluated were gamma-methacryloxypropyl trimethoxy silane commercially available under the trademark "Silane A174" by Union Carbide and a polyunsaturated polyalkoxysilane 50% in siloxanes commercially available under the trademark "CPS078.6S".

|  | Ex. 5A | Ex. 5B | Ex. 5C |
|---|---|---|---|
| Tackifying resin ("Piccolyte C115") | 44.603% | 44.603% | 45.045% |
| Antioxidant ("Vanox SKT") | 0.892% | 0.892% | 0.901% |
| Low acid number terpolymer resin ("Elvax 4320") | 13.381% | 13.381% | 13.514% |
| High acid number terpolymer resin ("Elvax 5610") | 40.143% | 40.143% | 40.540% |
| Silane ("Silane A174") | 0.981% | — | — |
| Silane ("CPS078.6S") | — | 0.981% | — |
|  | 100.000 | 100.000 | 100.000 |
| Viscosity at 400° F. | gelled | 9000 | 8000 |
| Density at 22° F. | — | 0.987 | 1.007 |
| Wgt/Gal | — | 8.22 | 8.39 |
| Hardness Shore A | — | 80–85 | 85–90 |
| *Original samples, unaged:* | | | |
| S/S clips | — | 266 lbs. | 276 lbs. |
| Failure | — | cohesive failure | cohesive failure |
| PBT clips | — | 243 lbs. | 299 lbs. |
| Failure | — | glass broke | cohesive failure |
| *After 4 hours in boiling water, then conditioned 24 hrs.* | | | |
| S/S clips | — | 246 lbs. | 263 lbs. |
| Failure | — | cohesive failure | cohesive failure |
| PBT clips | — | 253 lbs. | 240 lbs. |
| Failure | — | glass broke | cohesive failure |

It is advantageous, particularly for automotive applications, that the hot melt composition according to the present invention maintained its integrity after being immersed in boiling water. The use of CPS078.6S silane does offer some improvement with the PBT clips in that glass breakage occurred before the bond failed before and after immersion in the boiling water.

EXAMPLE 6

Two hot melt adhesives were prepared having the following compositions by weight to compare the effect of an alpha-methylstyrene and terpene tackifying resin in improving the high temperature resistance of the hot melt:

|  | Ex. 6A | Ex. 6B |
|---|---|---|
| Polypropylene | 11.80% | 11.80% |
| Alpha-methylstyrene tackifying resin ("Kristalex 1120") | — | 19.69% |
| Terpene tackifying resin ("Piccolyte C115") | 39.38% | 19.69% |
| Antioxidant ("Vanox SKT") | 0.79% | 0.79% |
| Silane ("CPS078.6S") | 0.79% | 0.79% |
| High acid number terpolymer resin ("Elvax 5610") | 35.43% | 35.43% |
| Low acid number terpolymer resin ("Elvax 4260") | 11.81% | 11.81% |
|  | 100.00% | 100.00% |
| Viscosity at 400° F. | 21000 | 68000 |
| Density at 22° C. | 0.923 | 0.972 |
| Hardness Shore A | 75–80 | 90 |
| Ring & Ball mp. °F. | 199–202° F. | 212–213° F. |
| *Adhesion at room temperature:* | | |
| PBT clip | 327 lbs. | 360 lbs. |
| Failure | glass broke | glass broke |
| S/S clip | 426 lbs. | 564 lbs. |
| Failure | glass broke | glass broke |
| *Adhesion at 80° C.:* | | |
| PBT clip | 121 lbs. | 105 lbs. |
| Failure | cohesive | cohesive |
| S/S clip | 151 lbs. | 189 lbs. |
| Failure | cohesive | cohesive |

An alpha-methylstyrene tackifying resin slightly improves the heat resistance with the stainless steel clips. The effect with the plastic clips is not so pronounced, possibly due to the insulating effect of the plastic.

EXAMPLE 7

Two hot melt adhesives were prepared having the following compositions by weight to compare an alpha-methylstyrene and rosin ester tackifying resin:

|  | Ex. 7A | Ex. 7B |
|---|---|---|
| Alpha-methylstyrene tackifying resin ("Kristalex 1120") | 17.48% | — |
| Resin ester tackifying resin ("Sylvatac 140") | — | 17.48% |
| Terpene tackifying resin ("Piccolyte C115") | 34.97% | 34.97% |
| Polypropylene | 10.49% | 10.49% |
| Antioxidant ("Vanox SKT") | 0.70% | 0.70% |
| Low acid number terpolymer resin ("Elvax 4260") | 17.48% | 17.48% |
| High acid number terpolymer resin ("Elvax 5610") | 17.48% | 17.48% |

|  | Ex. 7A | Ex. 7B |
|---|---|---|
| Silane ("CPS078.6S") | 0.70% | 0.70% |
| Wetting agent (sodium dioctyl sulfosuccinate) | 0.70% | 0.70% |
|  | 100.00% | 100.00% |
| Viscosity at 400° C. | 39,000 | 16,000 |
| Density at 22° C. | 0.988 | 1.011 |
| Hardness Shore A | 90 | 90 |
| Ring & Ball mp °B | 218-221 | 210-214 |
| Adhesion at room temperature: |  |  |
| PBT clips | 596 lbs. | 341 lbs. |
| Failure | glass broke | glass broke |
| S/S clips | 238 lbs. | 349 lbs. |
| Failure | cohesive failure | cohesive failure |
| Adhesion at 80° C. |  |  |
| PBT clips | 546 lbs. | 341 lbs. |
| Failure | cohesive | cohesive |
| S/S clips | 514 lbs. | 337 lbs. |
| Failure | cohesive failure | cohesive failure |

The composition containing the alpha-methylstyrene tackifying resin provides higher bond strengths than the one containing the rosin ester tackifying resin at both room temperature and at 80° C.

What is claimed is:

1. A hot melt composition comprising an ethylene/vinyl acetate/acrylic acid terpolymer resin having an acid number of 50 to 95, an ethylene/vinyl acetate/acid functional terpolymer resin having an acid number of 2 to 10, a tackifying resin and an atactic polypropylene.

2. A hot melt composition as in claim 1, wherein the tackifying resin is selected from the group consisting of alpha-methylstyrene resins, rosin resins, and alpha-pinene, beta-pinene and d-limonene terpene resins.

3. A hot melt composition as in claim 1, wherein the terpolymer resin of high acid number is present in an amount of 15 to 50 weight percent, the terpolymer resin of low acid number is present in an amount of 10 to 20 weight percent, the tackifying resin is present in an amount of 30 to 60 weight percent and the atactic polypropylene is present in an amount of 5 to 20 weight percent.

4. A hot melt composition as in claim 1, further comprising an antioxidant.

5. A hot melt composition as in claim 4, wherein the antioxidant is present in an amount of 0.5 to 1.5 weight percent.

6. A hot melt composition as in claim 1, wherein the terpolymer resin of high acid number contains 25 to 28% by weight of vinyl acetate and has an acid number of 50 to 70, a melt index of 450 to 550, and a ring and ball softening point of 102° to 108° C.

7. A hot melt composition as in claim 1, wherein the terpolymer resin of low acid number contains 27 to 29% by weight of vinyl acetate and has an acid number of 4 to 8, a melt index of 5 to 7, and a ring and ball softening point of 155° to 162° C.

8. A hot melt composition as in claim 1, wherein the tackifying resin is a polymerized d-limonene terpene resin.

9. A hot melt composition as in claim 1, wherein the tackifying resin has a ring and ball softening point of 110° to 150° C., a Gardner color of 2 to 10 and a flashpoint greater than 230° C.

10. A hot melt composition as in claim 4, wherein the antioxidant is 3,5-di-tert-butyl-4-hydroxyhydrocinnamic acid triester of 1,3,5-tris(2-hydroxyethyl)-s-triazine-2,4,6-(1H,3H,5H)-trione.

11. A hot melt composition as in claim 1, wherein the atactic polypropylene has a ring and ball softening point of 144° to 150° C., a specific gravity of 0.83 to 0.87, and a flashpoint greater than 260° C.

12. A hot melt composition as in claim 1, further comprising a silane.

13. A hot melt composition as in claim 12, wherein the silane is present in an amount of 0.5 to 1.0 weight percent.

14. A hot melt composition as in claim 13, wherein the silane is a polyunsaturated polyalkoxysilane 50% in siloxane.

15. A hot melt composition as in claim 1, further comprising a wetting agent.

16. A hot melt composition as in claim 15, wherein the wetting agent is present in an amount of 0.5 to 1.0 weight percent.

17. A hot melt composition as in claim 15, wherein the wetting agent is sodium dioctyl sulfosuccinate.

18. A hot melt composition comprising: 39 to 42 weight percent of an ethylene/vinyl acetate/acrylic acid terpolymer resin of high acid number; 12.5 to 14.5 weight percent of an ethylene/vinyl acetate/acid functional terpolymer resin of low acid number; 44 to 46 weight percent of tackifying resin; and 0.5 to 1.5 weight percent of a 3,5-di-tert-butyl-4-hydroxyhydrocinnamic acid triester of 1,3,5-tris(2-hydroxyethyl)-s-triazine-2,4,6-(1H,3H,5H)-trione antioxidant.

19. A hot melt composition comprising: 10 to 13 weight percent of an ethylene/vinyl acetate/acid functional terpolymer resin of low acid number; 33 to 36 weight percent of an ethylene/vinyl acetate/acrylic acid terpolymer resin of high acid number; 38 to 40 weight percent of tackifying resin; 10 to 16 weight percent of atactic polypropylene; and 0.5 to 1.5 weight percent of an antioxidant.

20. A hot melt composition comprising: 17 to 18 weight percent of an alpha-methylstyrene resin; 34 to 36 weight percent of a polymerized d-limonene terpene resin; 10 to 11 weight percent of atactic polypropylene; 0.5 to 1.0 weight percent of an antioxidant; 17 to 18 weight percent of ethylene/vinyl acetate/acid functional terpolymer resin of low acid number; 17 to 18 weight percent of ethylene/vinyl acetate/acrylic acid terpolymer resin of high acid number; 0.5 to 1.0 weight percent of a silane; and 0.5 to 1.0 weight percent of a wetting agent.

21. A hot melt composition comprising an ethylene/vinyl acetate/acrylic acid terpolymer resin having an acid number of 50 to 95, an ethylene/vinyl acetate/acid functional terpolymer resin having an acid number of 2 to 10, a tackifying resin and a silane.

22. A hot melt composition as in claim 21, wherein the tackifying resin is selected from the group consisting of alpha-methylstyrene resins, rosin resins, and alpha-pinene, beta-pinene and d-limonene terpene resins.

23. A hot melt composition as in claim 21, wherein the terpolymer resin of high acid number is present in an amount of 15 to 50 weight percent, the terpolymer resin of low acid number is present in an amount of 10 to 20 weight percent, the tackifying resin is present in an amount of 30 to 60 weight percent and the silane is present in an amount of 0.5 to 1.0 weight percent.

24. A hot melt composition as in claim 21, further comprising an antioxidant.

25. A hot melt composition as in claim 24, wherein the antioxidant is present in an amount of 0.5 to 1.5 weight percent.

26. A hot melt composition as in claim 21, wherein the terpolymer resin of high acid number contains 25 to 28% by weight of vinyl acetate and has an acid number of 50 to 70, a melt index of 450 to 550, and a ring and ball softening point of 102° to 108° C.

27. A hot melt composition as in claim 21, wherein the terpolymer resin of low acid number contains 27 to 29% by weight of vinyl acetate and has an acid number of 4 to 8, a melt index of 5 to 7, and a ring and ball softening point of 155° to 162° C.

28. A hot melt composition as in claim 21, wherein the tackifying resin is a polymerized d-limonene terpene resin.

29. A hot melt composition as in claim 21, wherein the tackifying resin has a ring and ball softening point of 110° to 150° C., a Gardner color of 2 to 10 and a flashpoint greater than 230° C.

30. A hot melt composition as in claim 24, wherein the antioxidant is 3,5-di-tert-butyl-4-hydroxyhydrocinnamic acid triester of 1,3,5-tris(2-hydroxyethyl)-s-triazine-2,4,6-(1H,3H,5H)-trione.

31. A hot melt composition as in claim 21, wherein an atactic polypropylene is present in an amount of 5 to 20 weight percent.

32. A hot melt composition as in claim 31, wherein the atactic polypropylene has a ring and ball softening point of 144° to 150° C., a specific gravity of 0.83 to 0.87, and a flashpoint greater than 260° C.

33. A hot melt composition as in claim 21, wherein the silane is a polyunsaturated polyalkoxysilane 50% in siloxane.

34. A hot melt composition as in claim 21, further comprising a wetting agent.

35. A hot melt composition as in claim 34, wherein the wetting agent is present in an amount of 0.5 to 1.0 weight percent.

36. A hot melt composition as in claim 34, wherein the wetting agent is sodium dioctyl sulfosuccinate.

37. A hot melt compositon comprising an ethylene/vinyl acetate/acrylic acid terpolymer resin having an acid number of 50 to 95, an ethylene/vinyl acetate/acid functional terpolymer resin having an acid number of 2 to 10, a tackifying resin and a 3,5-di-tert-butyl-4-hydroxyhydrocinnamic acid triester of 1,3,5-tris(2-hydroxyethyl)-s-triazine-2,4,6-(1H,3H,5H)-trione antioxidant.

38. A hot melt composition as in claim 37, wherein the terpolymer resin of high acid number is present in an amount of 15 to 50 weight percent, the terpolymer resin of low acid number is present in an amount of 10 to 20 weight percent, the tackifying resin is present in an amount of 30 to 60 weight percent and the antioxidant is present in an amount of 0.5 to 1.5 weight percent.

39. A hot melt compositon comprising an ethylene/vinyl acetate/acrylic acid terpolymer resin having an acid number of 50 to 95, an ethylene/vinyl acetate/acid functional terpolymer resin having an acid number of 2 to 10, a tackifying resin and a tetrakis[methylene(3,5-di-tert-butyl-4-hydroxyhydrocinnamate)]methane antioxidant.

40. A hot melt composition as in claim 39, wherein the terpolymer resin of high acid number is present in an amount of 15 to 50 weight percent, the terpolymer resin of low acid number is present in an amount of 10 to 20 weight percent, the tackifying resin is present in an amount of 30 to 60 weight percent and the antioxidant is present in an amount of 0.5 to 1.5 weight percent.

* * * * *